(12) United States Patent
James, Jr. et al.

(10) Patent No.: US 6,240,519 B1
(45) Date of Patent: May 29, 2001

(54) COMPUTER METHOD AND APPARATUS TO PROMPT FOR ADMINISTRATIVE PASSWORD TO FLASH A CORRUPTED NON-VOLATILE MEMORY

(75) Inventors: Don R. James, Jr.; Randall L. Hess, both of Cypress; Jeffrey D. Kane, Spring, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/070,936

(22) Filed: Apr. 30, 1998

(51) Int. Cl.⁷ .................................. G06F 11/30; H02H 3/05
(52) U.S. Cl. .................................................. 713/202; 714/6
(58) Field of Search ........................ 371/40.11; 711/100, 711/116, 103; 713/202; 714/6

(56) References Cited

U.S. PATENT DOCUMENTS

| | | | |
|---|---|---|---|
| 3,890,601 | 6/1975 | Pietrolewicz | 340/172.5 |
| 4,942,606 | 7/1990 | Kaiser et al. | 380/4 |
| 4,959,860 | 9/1990 | Watters et al. | 380/4 |
| 5,150,407 | 9/1992 | Chan | 380/4 |
| 5,325,532 | 6/1994 | Crosswy et al. | 395/700 |
| 5,327,531 | 7/1994 | Bealkowski et al. | 395/164 |
| 5,375,243 | 12/1994 | Parzych et al. | 395/725 |
| 5,377,343 | 12/1994 | Yaezawa | 395/425 |
| 5,388,267 | 2/1995 | Chan et al. | 395/700 |
| 5,544,356 | 8/1996 | Robinson et al. | 395/600 |
| 5,557,783 | 9/1996 | Oktay et al. | 395/550 |
| 5,603,055 | 2/1997 | Evoy et al. | 395/652 |
| 5,627,784 | 5/1997 | Roohparvar | 365/189.01 |
| 5,787,367 | 7/1998 | Berra | 701/1 |
| 5,870,520 | 2/1999 | Lee | 395/182.04 |
| 5,944,821 | 8/1999 | Angelo | 713/200 |

OTHER PUBLICATIONS

Intel Corp., *Intel 486 Sl Microprocessor SuperSet Programmer's Reference Manual*, Nov., 1992, pp. 6–28—6–53.

Philips Semiconductors, I²C Spec. Information—The I*hu* 2 Bus and how to use it (including specifications), 1993.

Intel Corp., *System Management Bus Specification*, Apr. 21, 1994 (Rev. 0.95).

(List continued on next page.)

*Primary Examiner*—William Grant
*Assistant Examiner*—Ronald D Hartman, Jr.
(74) *Attorney, Agent, or Firm*—Akin, Gump, Strauss, Hauer & Feld, L.L.P.

(57) ABSTRACT

An apparatus and a method to prompt for an administrative password during the boot block process to flash a corrupted ROM image. During a computer system's power-up and initialization, the flash ROM image is examined to determine if the image is corrupt. If so, the computer system executes certain protected code stored in the boot block of the ROM. When the computer system is booted from this boot block, a reduced set of capabilities are needed. One capability according to the invention, is the ability to flash a new ROM image to the corrupted ROM. Once booted from the boot block, the computer system prompts the user for a password preferably by flashing keyboard LEDs. Upon receiving a password, this password is compared to an administrative password stored in non-volatile memory. If the password matches the administrative password, then the computer system enables the ROM to accept a flash ROM image. If the password does not match, the ROM is disenabled, not accepting a flash ROM image.

51 Claims, 8 Drawing Sheets

OTHER PUBLICATIONS

Cates, Ron, et al., *Charge NiCd and NiMH Batteries Properly*, Electronic Design, Jun. 10, 1996, pp. 118, 120, 122.

EET Special Edition. *Part 2: Batteries—Power Technologies, Elec. Eng. Times*, Apr. 8, 1996, pp. 39–82.

Intel Corp., , chapter 20 System management Mode, pp. 20–1–20–9, 1994.

Compaq Computer Corporation, Phoenix Technologies Ltd., and Intel Corporation, *Preliminary Plug and Play BIOS Specification*, Version 1.0A. p. 7–64, Mar. 10, 1994.

Microchip Data Sheet Manual, *PIC16C5X EPROM/ROM–Based 8–Bit CMOS Microcontroller Series* (1995–1996).

Siemens Components, Inc., *Advertisement for SAB88C166 with on–board flash EPROM* (Sep. 1996).

Dipert, Brian, et al. *Designing with Flash Memory*, Copyright Annabooks 1993, San Diego, CA, pp. 1–84.

Messmer, Hans–Peter. *The Indispensable PC Hardware Book*, Addison–Wesley Publishing Company, Inc., 2nd edition Copyright 1995, pp. 709–713.

Curtis E. Stevens, et al. *ATAPI Removable Media Device BIOS Specification* Version 1.0, Jan. 30, 1997, pp. 1–18.

Compaq Computer Corporation *Reference Guide Compaq Deskpro/M.* Chapter 5 pp. 5–1 –5–13.

Western Digital, *Enhanced IDE 95/96 Guide*, Version 0.95, Mar. 17, 1995.

Advanced Micro Devices (AMD), *Am29F002T/Am29F002B 2 Megabit (262, 144 × 8–bit) CMOS 5.0 Volt–only, Sector Architecture Flash Memory*, Dec. 1996, Publication No. 20818, (Rev. B).

Intel Corporation, *DK440LX Motherboard Jumper Settings*. Http://Developer.intel.com/design/motherbd/dk/DK_CONFG.HTM.

Intel Corporation, *CN430TX Motherboard Jumper Settings*. Http://Developer.intel.com/design/motherbd/cn/CN_confg.htm.

National Semiconductor, *PC87307VUL SuperI/O Enhanced Sidewinder Lite Plug and Play Compatible Chip, with a Floppy Disk Controller, a Keyboard Controller, a Real Time Clock, Two Fast UARTs, Infrared Support and an IEEE1284 Parallel Port*, Feb. 1997.

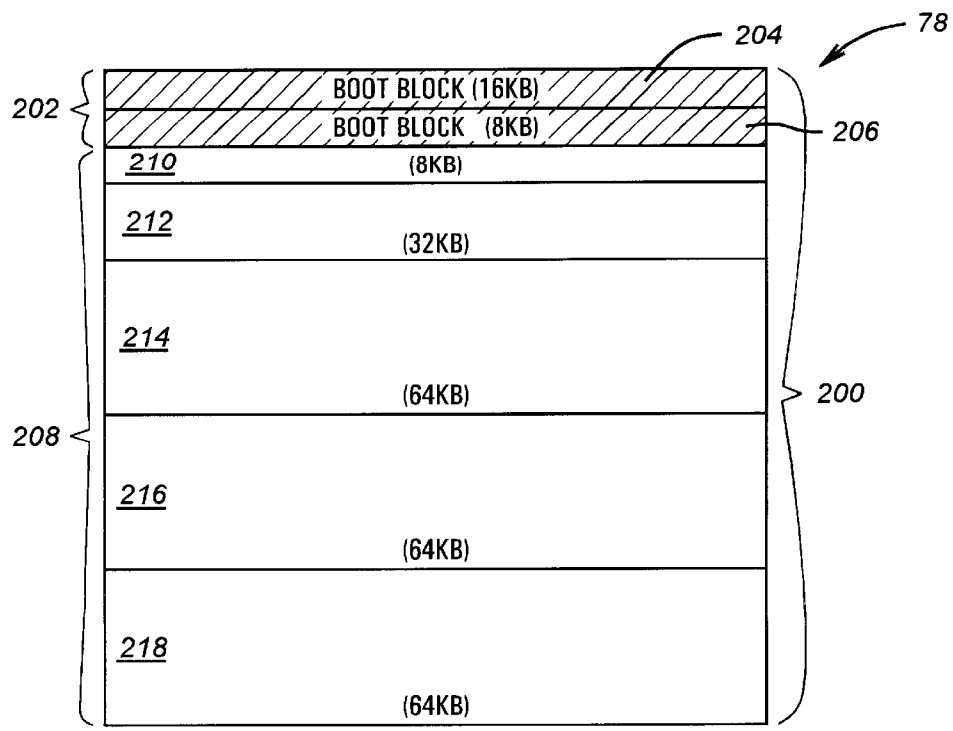
FIG. 2
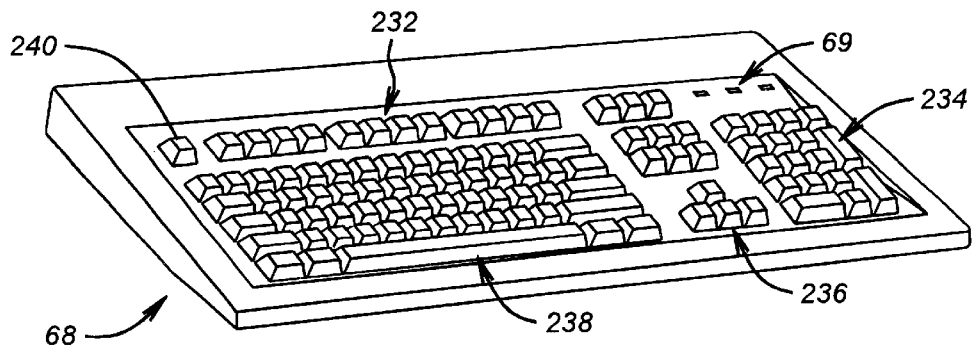
FIG. 3
| | CAPS LOCK | NUM LOCK | SCROLL LOCK | MEANING |
|---|---|---|---|---|
| 402 | ON | OFF | OFF | ADMIN PASSWORD REQUIRED. REMAINS LIT UNTIL A VALID ADMIN PASSWORD IS ENTERED. |
| 404 | OFF | ON | OFF | BOOT FAILED (DISKETTE NOT PRESENT, DRIVE NOT READY, ETC). SYSTEM MUST BE RESET TO RETRY BOOT. |
| 406 | OFF | OFF | ON | FLASH FAILED (SET BY ROMPAQ) |
| 408 | ON | ON | ON | FLASH COMPLETE (SET BY ROMPAQ) |
FIG. 5

COMPUTER METHOD AND APPARATUS TO PROMPT FOR ADMINISTRATIVE PASSWORD TO FLASH A CORRUPTED NON-VOLATILE MEMORY

BACKGROUND OF THE INVENTION

1. Field of the Invention

The present invention relates to flashing a corrupted image in a non-volatile memory, and more specifically to prompting the user for an administrative password using keyboard LEDs or an audible beep such that the user can flash the corrupted ROM.

2. Description of the Related Art

The pursuit of low maintenance computers has been a defining issue among personal computer manufactures for many years. The satisfaction of a personal computer (PC) user is related to the reliability of the PC and to the ease of the troubleshooting/correction procedures. PCs that require a low level of maintenance or eliminate troubleshooting and repair by outside technicians have advantages over maintenance intensive PCs. An error which often exceeds the average user's skill level is when the PC's system programmable Read Only Memory (ROM) becomes corrupt.

Historically ROM, which is non-volatile, was not in-system updatable. ROM memories store code and data required to initialize and operate a system. However, as system enhancement and upgrades became common, the desirability of an updatable ROM increased. A need for an updatable ROM was met by the creation of the Electrically-Erasable-Programmable-Read-Only-Memory (EEPROM). The EEPROM is in-system writable and non-volatile. The EEPROM, by means of an electric pulse, can be programmed and erased. A more recent innovation in the memory technology field is Flash ROM. Flash ROM is inherently non-volatile and allows for in-system updateability. Flash ROM can be updated by "flashing" a new ROM image on to the chip, while the system is operational, from a variety of possible sources, including removable media devices, modem links, or parallel or serial connectors.

Flash ROMs are frequently used to store embedded code in the PC. A PC system ROM traditionally contains the resident code that runs the system. A Basic Input/Output System (BIOS) is a typical embedded code storage application of the PC. The BIOS is low level code interfacing the operating system to the specific hardware implementation. Typical BIOS functions include the initialization of disk drives, including floppy, hard, and compact, and initialization of the video and graphical interfaces. The BIOS is specifically configured for each PC based on the presence of specific hardware and the current version or manufacturer of the hardware. If the PC hardware is updated or modified, the BIOS may need to be upgraded to properly initialize the new hardware. An updated BIOS can be flashed, by the user, to the Flash ROM, after the user has replaced or upgraded a component to the PC.

A potential problem exists when an updated BIOS is flashed. An incorrect BIOS could inadvertently be flashed or the flash could be interrupted resulting in a corrupted ROM. If this occurs, the system would not initialize. To prevent this, the Flash ROM memory array is divided into two distinct sections, the boot block and the main block. The previously discussed applications have all resided in the main block of the Flash ROM. The boot block of the Flash ROM is protected from an ordinary flash, and that data remains even after a corrupted Flash ROM image is flashed.

The boot block can thus be used to store kernel code necessary to initialize the basic components of the system if a corrupted ROM image is present. This may be no more than code sufficient to allow the corrupted ROM to be re-flashed. Typically, the boot block code cannot be altered by standard ROM power levels, such as 3–5 volts, the levels necessary to perform an in-system ROM flash. Instead, the boot block code is usually programmed by using higher voltage levels, such as 12 volts. Therefore even if the ROM is incorrectly flashed because of the code present in the boot block, the system still initializes enough to allow the user to flash the correct ROM image to the Flash ROM, using a variety of techniques. The boot block traditionally contains minimal initialization routines for a floppy disk and a keyboard, but no video interface because of the size of that code and its non-standard nature. Further convenience in the ability to correct a corrupted ROM would be desirable.

With the increase in distributed networks and the abilities of PCs to link to each other and to link to various networks, improvements in PC security is also desirable. Historically, a PC could be "secured" by physical isolation. Today's networked environment, however, makes such total isolation impractical. Therefore, techniques that enhance security of PCs would also be desirable.

SUMMARY OF THE INVENTION

A method, apparatus, and computer system according to the invention prompts for an administrative password before it permits flashing a new ROM image. The apparatus or computer system determines whether a non-volatile memory has become corrupt. If the nonvolatile memory is corrupt, then the apparatus or computer system prompts the user for a password using a non-video output device. A password is then entered via the input device. If the entered password matches an administrative password residing in the security device, then the security device enables the programming of the non-volatile memory. If the passwords do not match, the security device prevents programming of the non-volatile memory.

BRIEF DESCRIPTION OF THE DRAWINGS

A better understanding of the present invention can be obtained when the following detailed description of the preferred embodiment is considered in conjunction with the following drawings, in which:

FIG. 2 is a block diagram of the section partitioning of a Flash ROM of FIG. 1.

FIG. 3 is a diagram of a standard keyboard of FIG. 1.

FIG. 5 is table of a predefined prompt set according the current invention.

DETAILED DESCRIPTION OF THE PREFERRED EMBODIMENT

The following disclosures are hereby incorporated by reference:

U.S. application Ser. No. 09/071,127, entitled "A COMPUTER METHOD AND APPARATUS TO FORCE BOOT BLOCK RECOVERY," by Don R. James, Jr., Randall L. Hess, and Jeffrey D. Kane, filed concurrently herewith;

U.S. application Ser. No. 09/070,821, entitled "BOOT BLOCK SUPPORT FOR ATAPI REMOVABLE MEDIA DEVICES," by Paul J. Broyles and Don R. James, Jr., filed concurrently herewith;

U.S. application Ser. No. 09/070,457, entitled "SECURITY METHODOLOGY FOR DEVICES HAVING PLUG AND PLAY CAPABILITIES," by Christopher E. Simonich and Robin T. Tran, filed concurrently herewith;

U.S. application Ser. No. 09/070,942, entitled "METHOD AND APPARATUS FOR REMOTE ROM FLASHING AND SECURITY MANAGEMENT FOR A COMPUTER SYSTEM," by Manuel Novoa, Paul H. Mccann, Adrian Chrisan, Wayne P. Sharum and Paul B. Hokanson, filed concurrently herewith;

U.S. Pat. No. 6,073,206, entitled "A METHOD FOR FLASHING ESCD AND VARIABLES INTO A ROM," by Mark A. Piwonka, Louis B. Hobson, Jeffrey D. Kane and Randall L. Hess, filed concurrently herewith;

U.S. application Ser. No. 08/684,413, entitled "FLASH ROM PROGRAMMING," by Patrick R. Cooper, David J. Delisle, and Hung Q. Le filed Jul. 19, 1996; and U.S. application Ser. No. 09/071,128, entitled "A UNIFIED PASSWORD PROMPT OF A COMPUTER SYSTEM," by Michael D. Garrett, Randall L. Hess, Chi W. So, Mohammed Anwar Mariz, filed concurrently herewith; all of which are assigned to the assignee of this invention.

Figure 1:
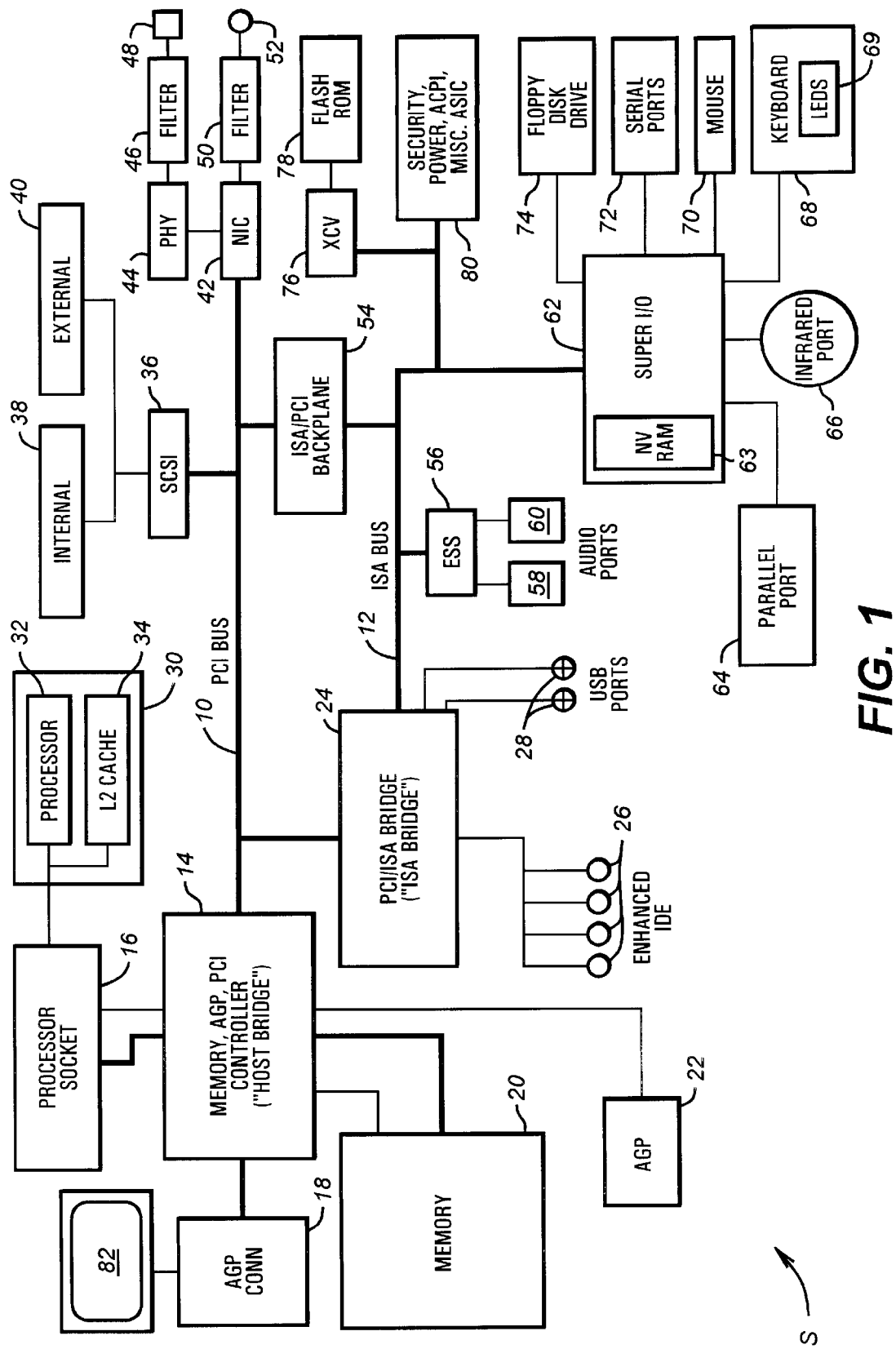
FIG. 1 is a block diagram of the computer system having a Flash ROM according to the present invention.

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the "ISA bridge") bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX Host Bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and nonintegral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a direct memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), RTC, keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit ($I^2C$) protocol.

The PCI bus 10 couples a variety of devices that generally take advantage of a high speed data path. This includes a small computer system interface (SCSI) controller 26, with both an internal port 38 and an external port 40. In the disclosed embodiment, the SCSI controller 26 is a AIC-7860 SCSI controller. Also coupled to the PCI bus 10 is a network interface controller (NIC) 42, which preferably supports the ThunderLan™ power management specification by Texas Instruments. The NIC 42 is coupled through a physical layer 44 and a filter 46 to an RJ-45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. The Super I/O 62 contains several logical devices, one of which is a Real Time Clock (RTC). Resident in the RTC of the Super I/O chip 62 is non-volatile Random Access Memory (NV RAM) 63. This Super I/O chip 62 provides a variety of input/output functionality, including a parallel port 64, an infrared port 66, a keyboard controller for a keyboard 68, a mouse port for a mouse 70, additional series ports 72, and a floppy disk drive controller for a floppy disk drive 74. These devices are coupled through connectors to the Super I/O 62. Resident on the keyboard 68 are light emitting diodes (LEDs) 69. The floppy disk drive 74 includes disk drives for a 3½" and 5¼" floppy disks, and includes Advanced Technology Attachment Packet Interface (ATAPI) drives.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic.

Finally, a video display 82 can be coupled to the AGP connector 18 for display of data by the computer system S.

Again, a wide variety of systems could be used instead of the disclosed system S without detracting from the spirit of the invention.

Turning now to FIG. 2, a sector partitioning structure 200 of the flash ROM 78 in the disclosed embodiment is shown. However, while this diagram is illustrative of one embodiment, the techniques according to the invention can be implemented in a variety of embodiments and can be implemented with a variety of non-volatile memory. The sector partitioning structure 200 is determined by the sector architecture of the particular flash ROM 78. The flash ROM 78 used in the disclosed embodiment is an Advanced Micro Devices (AMD) AM29F002 flash ROM memory. The sector partitioning structure 200 shows a top boot block design architecture. The Advanced Micro Devices AM29F002 flash ROM memory can also be implemented with a bottom boot block design architecture.

A boot block sector 202 consists of a first boot block sector 204 of 16 kilobytes and a second boot block sector 206 of 8 kilobytes. The remaining 232 kilobytes form a system block 208 divided into 5 sectors 210–218. In the disclosed embodiment, the first sector 210 has 8 kilobytes, the second sector 212 has 32 kilobytes, and the remaining three sectors 214, 216, and 218 have 64 kilobytes equally. The code stored in the system block 208 preferably contains the Basic Input/Output System (BIOS) code. The BIOS is code interfacing between the operating system and the specific hardware configuration, allowing the same operating system to be used with different hardware configurations. The boot block 202 contains the code necessary to initialize the systems when an anomaly during power-up is detected. During a boot block 202 initialization, preferably a reduced set of hardware is initialized, thus reducing the size of the code in the boot block 202. The boot block 202 code typically contains an initialization procedure for only the hardware necessary to perform limited functions. Typically a limited function necessary to be performed during boot block 202 initialization is the flash of the ROM 78. The boot block 202, according to the invention, contains code initializing the hardware components necessary to flash the ROM 78 and to prompt the user for an administrative password. The boot block 202 code is contained within the boot block 202, which is protected from spurious initialization. The system block 208 is electronically protected, but the system S is at least physically capable of disabling that protection and overwriting the system block 208. During a flash, the system block 208 sectors is rewritten with a new flash ROM image.

Turning to FIG. 3, illustrated is a standard keyboard 68 with LEDs 69. The keys of the keyboard 68 include function keys 232, a numeric keypad 234, scroll keys 236, QWERTY keys 238, and an escape key 240.

The function keys 232 include 12 keys, designated F1–F12, located along the top of keyboard 68. The numeric keypad 234 is located on the right side of the keyboard. The numeric keypad is configured to resemble a standard adding machine format. The scroll keys 236 are located between the numeric keypad 234 and the QWERTY keys 238. The scroll key 236 allow the user to move a cursor, displayed on the video display 82 of FIG. 1, throughout a document or program.

The QWERTY keys 238 occupy the left and center of the keyboard 68. The QWERTY keys 238 resemble the standard layout of a typewriter. The QWERTY keys 238 include the letters of the alphabet, digits 0–9, and standard documentation characters. The escape key 240 is located in the top left corner of the keyboard 68. The escape key 240 can be used to communicate a variety of information to the computer system S, depending on the program currently being executed by the computer system S.

During initial power-up (not a warm boot) the computer system S can be forced into booting from the boot block 202 code by pressing and holding down the escape key 240 prior to power-up and during the initialization period. If the escape key 240 is detected, the processor 32 executes the boot block 202 code and proceeds as if a corrupted ROM is detected. This procedure is discussed in copending application. "A COMPUTER METHOD AND APPARATUS TO FORCE BOOT BLOCK RECOVERY," incorporated by reference above.

Figure 4:
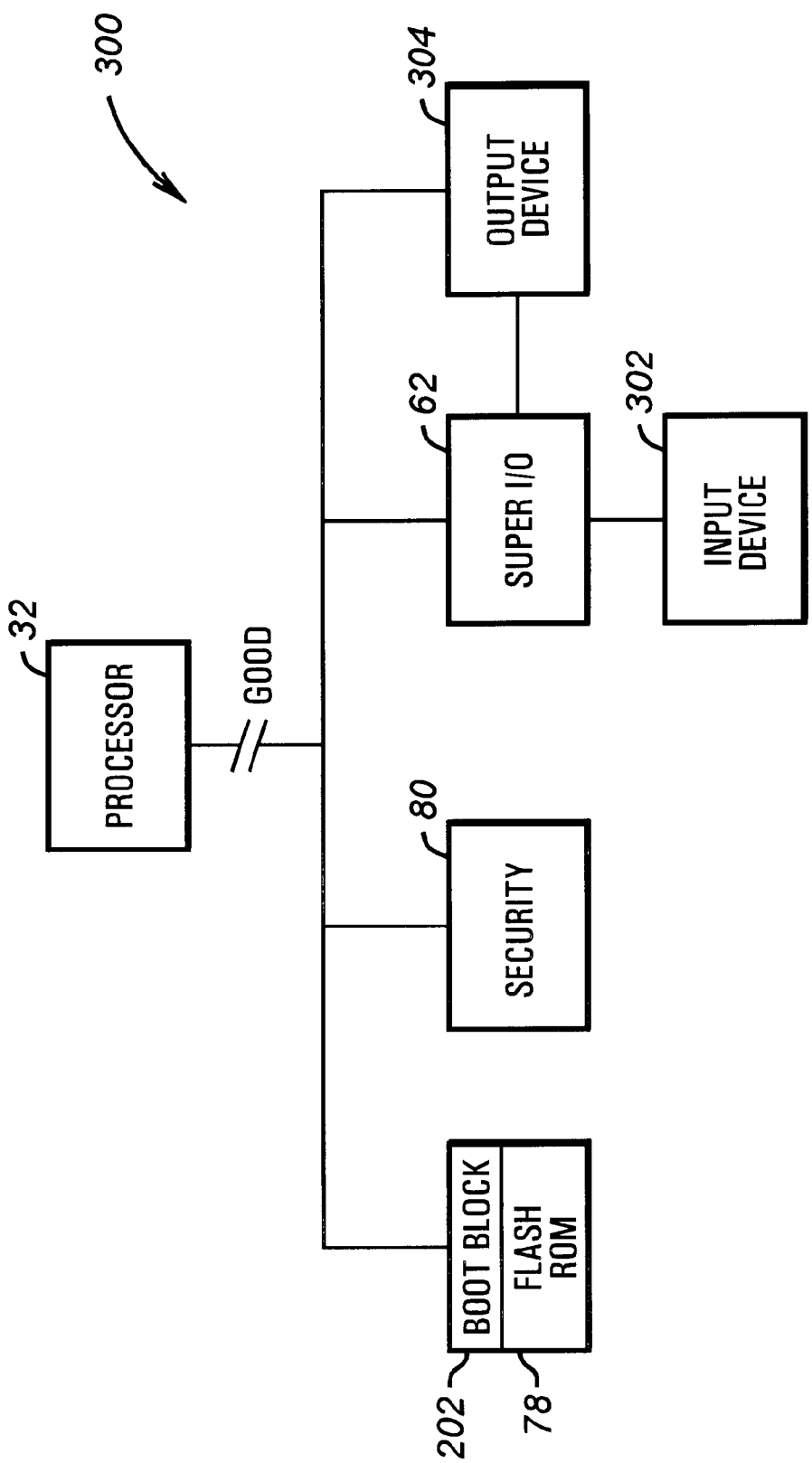
FIG. 4 is a block diagram of components initialized during a boot block procedure.
Figure 6A:
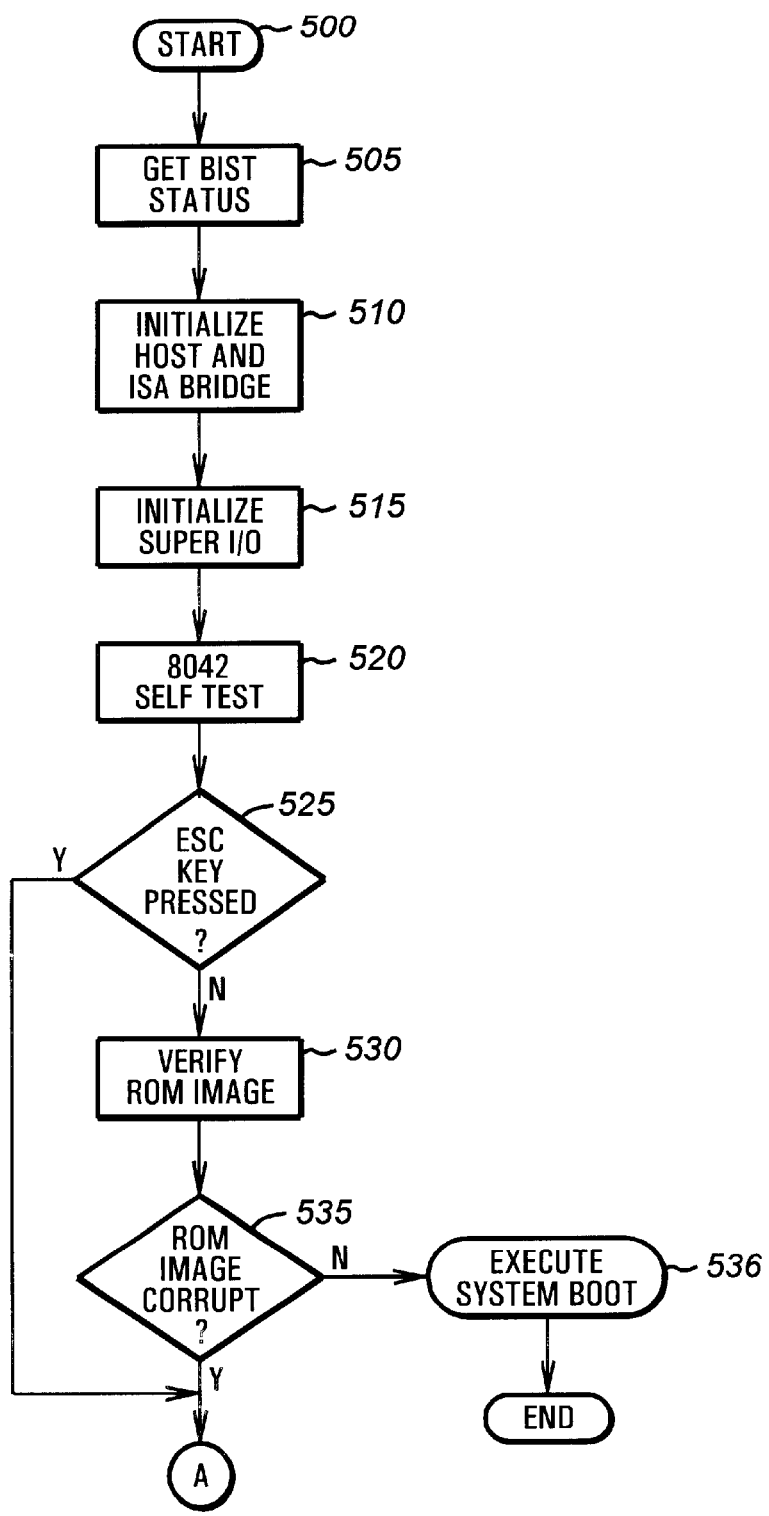
FIGS. 6A–6D are a flow chart of boot block code resident in the Flash ROM of FIG. 1.
Figure 6B:
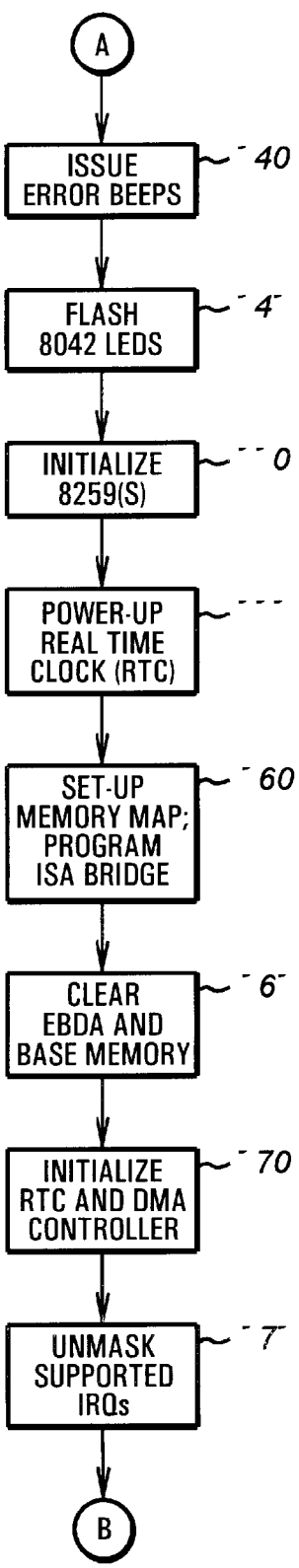
Figure 6C:
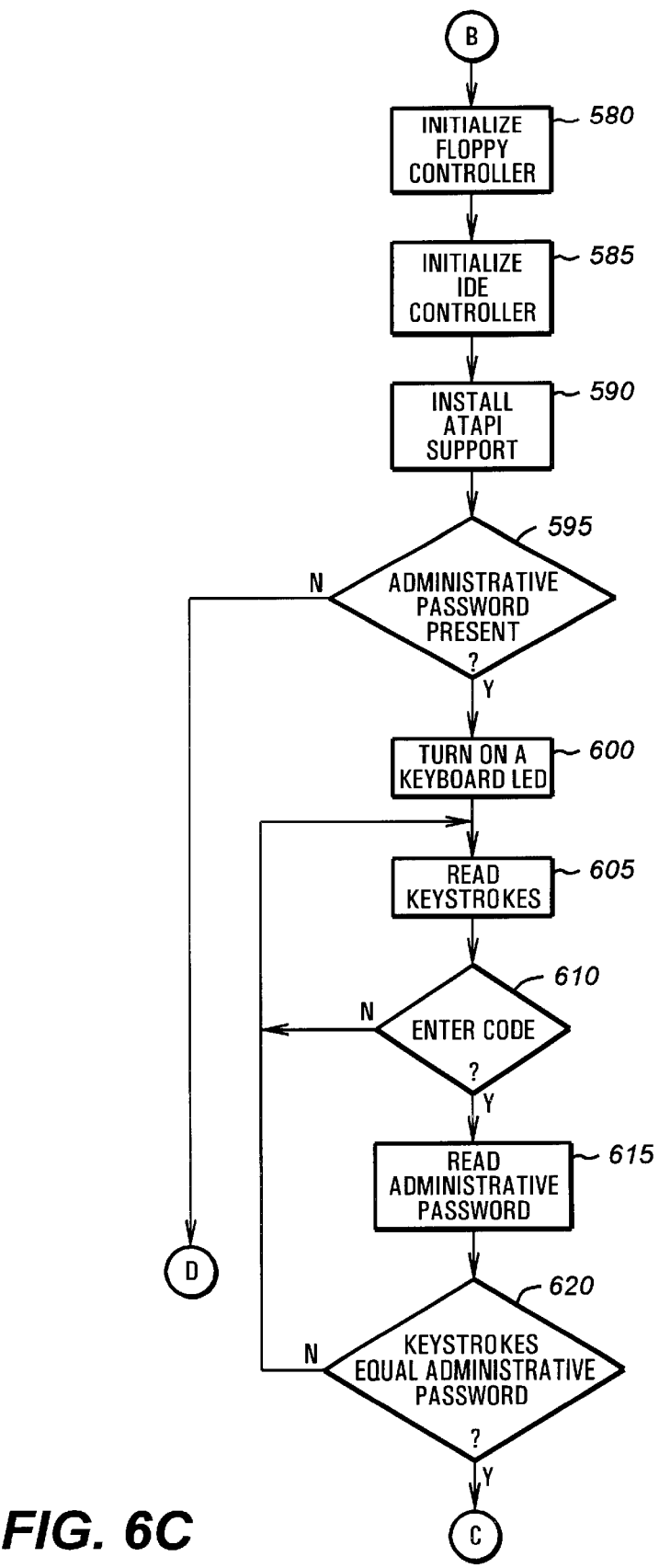
Figure 6D:
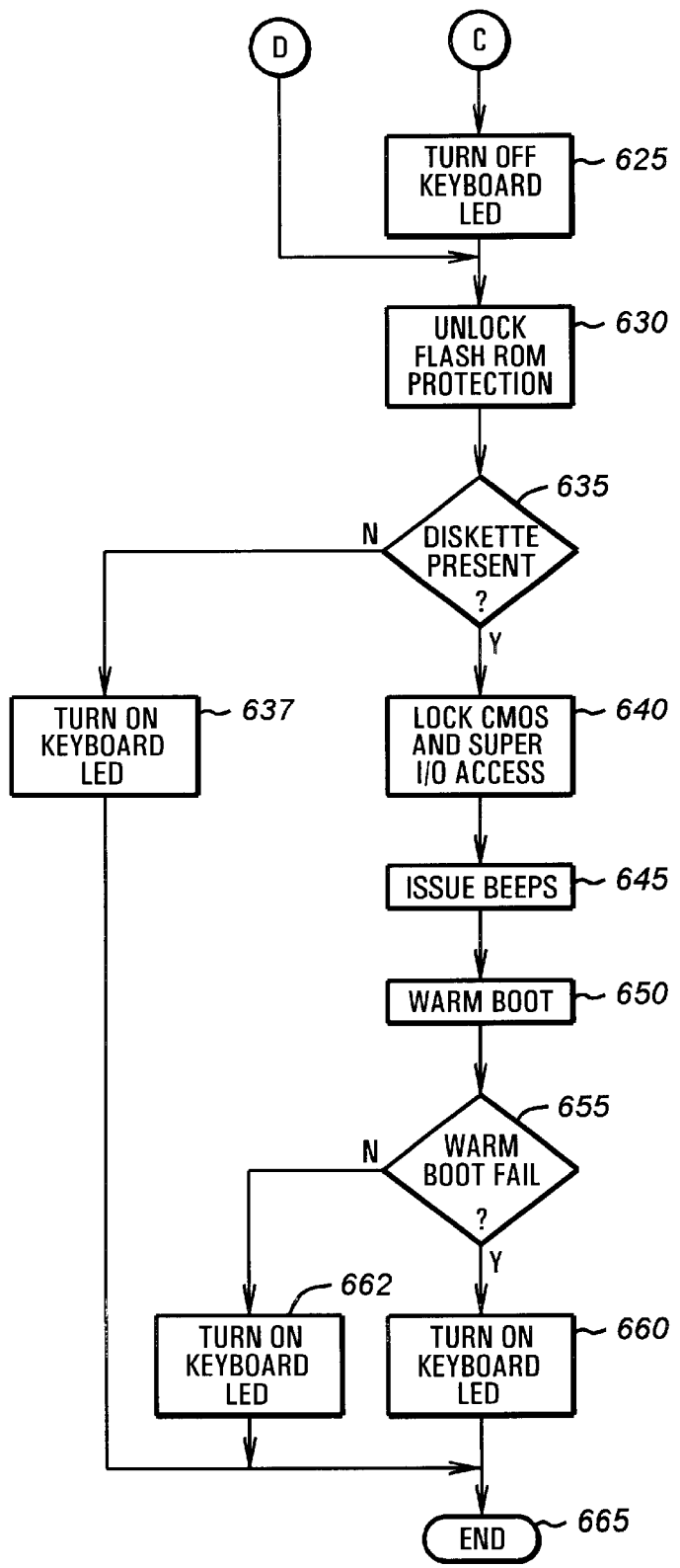

Turning to FIG. 4, illustrated is a block diagram 300 of the typical components of the system S that are initialized by the boot block 202. The processor 32 executes the system block 208 code and boot block 202 code contained in the ROM 78. The processor 32, during initial power up and execution of boot block 202 code determines if the flash ROM 78 has become corrupt. If the flash ROM 78 is corrupt, then the processor 32 executes re-flash portions of the boot block 202 code. Also, during initial power up, the Super I/O device 62 and the security device 80 are initialized by the processor 32. Upon initialization of the Super I/O device 62, the administrative password resident in the Super I/O's 62 NV RAM 63 is sent to the security device 80. If no administrative password is present in the Super I/O 62 NV RAM 63, then such is designated to the security device 80. Upon receiving the administrative password from the Super I/O device 62, the security device 80 electronically protects the flash ROM 78 from unauthorized writes. Unless the proper password is provided, the security device 80 continues to electronically protect the flash ROM 78 so that it is unable to be flashed.

The password in the disclosed embodiment is the administrator password, however, according to the techniques of the inventions, a wide variety of passwords could be implemented. An administrator password and a power-on password are described in copending application "UNIFIED PASSWORD PROMPT OF A COMPUTER SYSTEM," previously incorporated by reference.

The processor 32, after determining that the flash ROM 78 is corrupt, continues to execute the boot block 202 code. During the boot block 202 procedure, the processor 32 initializes an input device 302 and an output device 304. After an administrative password has been sent from the I/O device 62 to the security device 80, the processor 32 prompts the user for a password via the output device 304. In the disclosed embodiment the output device 304 is the keyboard 68 light emitting diodes (LEDs) 69 (FIG. 1). As discussed in conjunction with FIG. 4 below, the LEDs 69 are flashed in a predetermined manner to alert the user that a password should be entered at that time. Although the disclosed embodiment implements the keyboard LEDs 69 as the output device, the techniques according to the invention could be implemented using a wide variety of output devices which include, but not limited to, using a sound system.

Preferably, however, the output device is one that is standardized. As keyboard LEDs are highly standardized, the boot block 202 code can be the same for any keyboard. The processor 32 then monitors the input device 302 to determine if the appropriate administrative password is entered. The input device 302 in the disclosed embodiment is the keyboard 68 (FIG. 1). However, while the keyboard 68 is illustrative of one embodiment of the input device 302, the techniques according to the invention could be implemented using a wide variety of input devices 302, including but not limited to the mouse 70 (FIG. 1). If the administrative password entered by the user is correct and matches the administrative password stored in the security device 80 then the processor 32 commands the security device 80 to unprotect the flash ROM 78. This enables the programming of the flash ROM 78.

The boot block 202 code typically is small in relation to the system block 208 code and, typically, the video display 82 drivers are complex, lengthy, and specific to the model of video display 82, itself. So, initializing and utilizing output devices 304 whose driver code is small and standardized compared to the video display 82 driver code are desired when the system is booted with the boot block 202 code. The driver code for flashing the LEDs 69 is small and standardized when compared to the video display 82 driver code. Therefore, output devices 304 other than the video display 82 are desired.

Turning now to FIG. 5, illustrated is a table 400 of a predefined prompt set for the keyboard 68 LEDs 69 of the disclosed embodiment. While this table 400 is illustrative of one embodiment, the techniques according to the invention could be implemented in a wide variety of predetermined prompt sets. The table 400 consists of 4 sets of prompts. A first prompt 402 consists of the capslock LED "On," the numlock LED "Off," and the scrolllock LED "Off." When this predetermined set is displayed the computer system S is awaiting for the administrative password to be entered. This system S remains in this state until a valid administrative password has been entered. A second prompt 404 consists of the capslock LED "Off," the numlock LED "On," and the scrolllock LED "Off." When this predetermined set is displayed, the system S is conveying that the boot has failed and that the system S must be reset to retry the boot. To retry the boot, the system S must be powered down, then powered up again. A third prompt 406 consists of capslock LED "Off," numlock LED "Off," and the scrolllock LED "On." When this predetermined set is displayed, the system S is conveying that the flash has failed and that the boot process must be initiated again. A fourth prompt 408 consists of capslock LED "On," numlock LED "On," and the scrolllock LED "On." When this predetermined set is displayed, the flash has completed and no error has been detected during the flash process.

Turning to FIGS. 6A–6D, illustrated is a flow chart of the boot block 202 code contained in the flash ROM 78. A start routine 500 consists of the power-up procedure of the system. The processor 32 first proceeds to the built-in self test (BIST) at step 505. After obtaining the BIST status at step 505, the processor 32 then proceeds to initialize host and ISA bridges at step 510. The processor 32 then initializes the Super I/O 62 at step 515 and then performs an 8042 self test at step 520. The 8042 self test consists of doing a self test on the keyboard 68 and a keyboard controller contained in the Super I/O 62. The processor 32 then determines whether the escape key has been pressed at step 525. If so, then the processor 32 issues error beeps at step 540. By pressing the escape key during power-up, the computer system S is forced into boot block recovery. This is described in copending application titled "A COMPUTER METHOD AND APPARATUS TO FORCE BOOT BLOCK RECOVERY," incorporated by reference above. If the escape key was not pressed at step 525 during power up, then the processor 32 verifies the ROM 78 image at step 530. When the processor 32 verifies the ROM 78 image, the processor 32 determines whether the ROM 78 has become corrupt at step 535. If not, then the processor 32 proceeds to step 536, and executes the system block 208 code. However, if the ROM 78 image is corrupt, then the processor 32 continues to execute the boot block 202 code by proceeding to step 540 in FIG. 6B.

The processor 32 causes error beeps at step 540 and then flashes the keyboard 68 LEDs 69 at step 545 via an 8042 keyboard controller in the Super I/O 62. Then the processor 32 initializes the 8259s interrupt controllers in step 550. The processor 32 then powers up a real time clock (RTC) in step 555 and sets up a memory map and programs the ISA bridge 12 in step 560. The processor 32 then clears the Extended BIOS Data Area (EBDA) and base memory at step 565 before initializing the real time clock (RTC) and direct memory access (DMA) controller at step 570. The processor 32 then unmasks supported interrupt requests (IRQs) at step 575. Proceeding to FIG. 6C, the processor 32 initializes the floppy controller at step 580, initializes the IDE controller at step 585, and installs the Advanced Technology Attachment Packet Interface (ATAPI) support in step 590. These devices are necessary if used to flash the ROM 78 image. ATAPI support is described in copending application "BOOT BLOCK SUPPORT FOR ATAPI REMOVABLE MEDIA DEVICES," previously incorporated by reference. Next, the processor 32 determines if the administrative password is present in the security device 80 at step 595. If no administrative password is present, then the processor 32 proceeds to step 630 (FIG. 6D), and unlocks the flash ROM protection. If the administrative password is present in the security device 80, then the processor 32 instead proceeds from step 595 to turn on the keyboard 68 LEDs 69 in step 600 in accordance with the exemplary predefined prompt set shown in FIG. 5. Next the processor 32 reads any keystrokes entered via the keyboard 68 at step 605. If no keystrokes have been entered via the keyboard 68, the processor 32 continues to monitor for key strokes at step 610. After a return key has been encountered, the processor 32 proceeds to step 615 to read the administrative password from the security device 80. The administrative password is then compared to the keystrokes entered at step 620. If they are not equal, the processor 32 returns to step 605 to monitor keystrokes and again waits for a proper keystrokes to be entered. If the keystrokes do equal the administrative password, the processor 32 turns off the keyboard 68 LEDs 69 at step 625 in FIG. 6D.

The processor 32 then unlocks the flash ROM 78 protection at step 630 and determines if a diskette is present in the floppy drive 74 at step 635. If no diskette is present, the processor then turns on the keyboard 68 LEDs 69, in accordance with the exemplary predefined prompt set, in step 637 before ending the procedure in step 665. The system must be reset to retry ROM flash. If a diskette is present, the processor locks the CMOS and Super I/O access at step 640. The processor 32 then issues audio beeps at step 645 and then performs a boot of the system at step 650. The boot is performed by issuing an INT 19 software interrupt. The boot is performed by the initialized floppy drive or ATAPI drive. At this point, the boot is of a minimal system whose purpose is to re-flash the flash ROM 78. So, after boot, the minimal system loads an executable for flashing the flash ROM 78, which is now unprotected. This routine is discussed below in conjunction with FIG. 7. If the boot fails, then the processor 32 turns on the keyboard 68 LEDs 69, in accordance with the exemplary predefined prompt set, at step 660 to alert the user. If the boot does not fail, the processor 32 turns on the keyboard 68 LEDs 69, in accordance with the exemplary predefined prompt set, at step 662 and continues to step 665, where the routine is complete.

Figure 7:
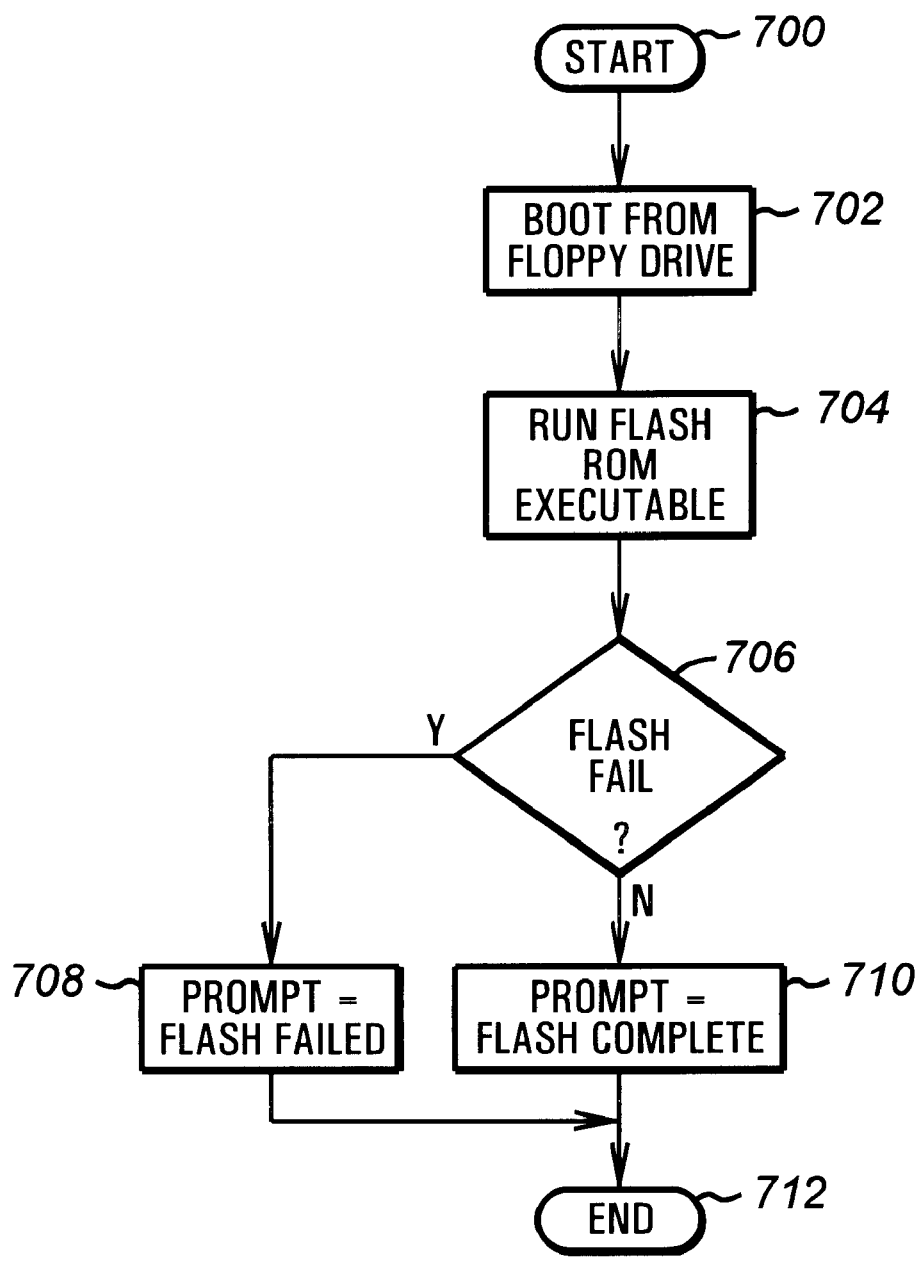
FIG. 7 is a flow chart of initialization code resident in the manufactures ROM flash floppy disk.

Turning now to FIG. 7, illustrated is a flow chart of the ROM program flashing code. The ROM program flashing code preferably resides on a floppy disk and is produced by the manufacturer to flash the flash ROM 78 using the above identified procedure. A start routine 700 consists of the floppy disk initialization. The floppy disk drive 74 verifies that a floppy disk is present, if the disk is present, the computer system S boots from the floppy disk in step 702 as discussed above in conjunction with FIGS. 6A and 6B. The floppy disk typically contains the minimal operating system necessary to flash the ROM 78 and an executable file, which is automatically executed when the floppy disk boots the system. The processor 32 executes the file, flashing a new ROM image to the flash ROM 78 in step 704. After the new ROM image has been flashed to the flash ROM 78, the processor 32 determines if the flash failed in step 706. If the flash failed, then the predetermined prompt set 406 for flash failure is displayed using the keyboard 68 LEDs 69 in step 708, then the processor 32 continues to step 712, where the routine is complete. If the flash did not fail, then the predetermined prompt set 408 for flash complete is displayed using the keyboard 68 LEDs 69 in step 710. The processor 32 then continues to step 712, where the routine is complete. The flow chart diagram ends with step 712.

The techniques for flashing the flash ROM 78 are well known. Further, although the disclosed embodiment shows unlocking the flash ROM 78 and then booting from a floppy drive, which in turn holds the ROM flashing code of FIG. 7, instead the ROM flashing code could be held in the boot block 202 itself, and the new flash ROM image downloaded via the serial port 72 or the parallel port 64. Such a technique is described, for example, in copending application "FLASH ROM PROGRAMMING", previously incorporated by reference. Further, other input/output devices could be implemented to receive the ROM image.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method to prompt for an administrative password before flashing an uncorrupted image into a non-volatile memory in a computer system, the method comprising the steps of:
   determining whether the non-volatile memory has become corrupt; and
   responsive to determining that the non-volatile memory has become corrupt, performing the steps of:
   producing a user perceivable password prompt;
   accepting a password to the computer system responsive to the password prompt; and
   if the password matches the administrative password, enabling
   programming of the non-volatile memory, else disabling programming of the non-volatile memory.

2. The method of claim 1, further comprising the step of programming the nonvolatile memory.

3. The method of claim 2, wherein the programming of the non-volatile memory is from a floppy drive.

4. The method of claim 2, wherein the programming of the non-volatile memory is from a serial port.

5. The method of claim 2, wherein the programming of the non-volatile memory is from a ATAPI device.

6. The method of claim 2, wherein the programming of the non-volatile memory is from a parallel port.

7. The method of claim 1, wherein the non-volatile memory is a flash Read Only Memory (ROM) having a boot block and a writable portion, wherein the boot block requires a higher programming voltage than the writable portion.

8. The method of claim 1, wherein the non-volatile memory is a programmable ROM.

9. The method of claim 1, wherein the non-volatile memory includes a boot block.

10. The method of claim 9, wherein the boot block cannot be flashed with the same voltage as a remainder of the non-volatile memory.

11. The method of claim 1, wherein the step of producing the user perceivable password prompt is producing an audio prompt.

12. The method of claim 1, wherein the step of producing the user perceivable password prompt is blinking of a light emitting diode (LED) on the keyboard.

13. The method of claim 1, wherein the user perceivable password prompt is a prompt via a driver in a boot block that is small and standardized relative to a video driver and fits in the boot block along with other necessary drivers.

14. The method of claim 1, wherein the administrative password is stored in a nonvolatile RAM.

15. The method of claim 1, wherein the administrative password is an administrator password.

16. The method of claim 1, wherein the administrative password is a power-on password.

17. An system to prompt for an administrative password before flashing an uncorrupted image for use with a processor, the system comprising:
   a non-volatile memory;
   a boot block residing in the non-volatile memory; and
   boot block code stored in the boot block, the boot block code, when executed, causing the processor to perform the steps of:
   determining whether the non-volatile memory has become corrupt; and
   responsive to determining that the non-volatile memory has become corrupt, performing the steps of:
   providing a user perceivable password prompt;
   accepting a password responsive to the password prompt; and
   if the password matches the administrative password, enabling the programming of the non-volatile memory, else disabling the programming of the non-volatile memory.

18. The system of claim 17, further comprising the step of programming the nonvolatile memory.

19. The system of claim 18, wherein the programming of the non-volatile memory is from a floppy drive.

20. The system of claim 18, wherein the programming of the non-volatile memory is from a serial port.

21. The system of claim 18, wherein the programming of the non-volatile memory is from a ATAPI device.

22. The system of claim 18, wherein the programming of the non-volatile memory is from a parallel port.

23. The system of claim 17, wherein the non-volatile memory is a flash Read Only Memory (ROM) having a boot block and a writable portion, wherein the boot block requires a higher programming voltage than the writable portion.

24. The system of claim 17, wherein the non-volatile memory is a programmable ROM.

25. The system of claim 17, wherein the boot block cannot be flashed with the same voltage as a remainder of the non-volatile memory.

26. The system of claim 17, wherein the step of producing the user perceivable password prompt is producing an audio prompt.

27. The system of claim 17, wherein the step of producing the user perceivable password prompt is blinking of a light emitting diode (LED) on the keyboard.

28. The system of claim 17, wherein the user perceivable password prompt is a prompt via a driver in a boot block that is small and standardized relative to a video driver and fits in the boot block along with other necessary drivers.

29. The system of claim 17, wherein the administrative password is stored in a nonvolatile RAM.

30. The system of claim 17, wherein the administrative password is an administrator password.

31. The system of claim 17, wherein the administrative password is a power-on password.

32. A computer system that prompts for an administrative password before flashing an uncorrupted image, the computer system comprising:

a processor;

a non-volatile memory coupled to the processor;

a user input device coupled to the processor for receiving a password;

an output device coupled to the processor for generating a perceivable password prompt;

a security device coupled to the processor for enabling and disabling programming of the non-volatile memory;

a boot block residing in the non-volatile memory; and boot block code stored in the boot block, the boot block code, when executed, causing the processor to perform the steps of:

determining whether the non-volatile memory has become corrupt; and responsive to determining that the non-volatile memory has become corrupt, performing the steps of:

providing a user perceivable password prompt to the output device;

accepting a password from the user input device responsive to the password prompt; and if the password matches the administrative password, enabling the programming of the non-volatile memory via the security device, else disabling the programming of the non-volatile memory via the security device.

33. The computer system of claim 32, further comprising the step of programming the non-volatile memory.

34. The computer system of claim 33, wherein the programming of the non-volatile memory is from a floppy drive.

35. The computer system of claim 33, wherein the programming of the non-volatile memory is from a serial port.

36. The computer system of claim 33, wherein the programming of the non-volatile memory is from a ATAPI device.

37. The computer system of claim 33, wherein the programming of the non-volatile memory is from a parallel port.

38. The computer system of claim 32, wherein the non-volatile memory is a flash Read Only Memory (ROM) having a boot block and a writable portion, wherein the boot block requires a higher programming voltage than the writable portion.

39. The computer system of claim 32, wherein the non-volatile memory is a programmable ROM.

40. The computer system of claim 32, wherein the boot block cannot be flashed with the same voltage as a remainder of the non-volatile memory.

41. The computer system of claim 32, wherein the step of producing the user perceivable password prompt is producing an audio prompt.

42. The computer system of claim 32, wherein the step of producing the user perceivable password prompt is blinking of a light emitting diode (LED) on the keyboard.

43. The computer system of claim 32, wherein the user perceivable password prompt is a prompt via a driver in a boot block that is small and standardized relative to a video driver and fits in the boot block along with other necessary drivers.

44. The computer system of claim 32, wherein the administrative password is stored in a non-volatile RAM.

45. The computer system of claim 32, wherein the administrative password is an administrator password.

46. The computer system of claim 32, wherein the administrative password is a power-on password.

47. The computer system of claim 32, wherein the user input device is a keyboard.

48. The computer system of claim 32, wherein the user input device is a mouse.

49. The computer system of claim 32, wherein the output device is a keyboard LED.

50. The computer system of claim 32, wherein the output device is a sound system.

51. The computer system of claim 32, wherein the security device is an Application Specific Integrated Circuit.

* * * * *